(12) United States Patent
Trout et al.

(10) Patent No.: US 6,889,444 B2
(45) Date of Patent: May 10, 2005

(54) ANTLER SCORING SYSTEM

(76) Inventors: Blair S. Trout, Box 248, Golden Valley, ND (US) 58541; Scott A. Wolff, P.O. Box 248, Golden Valley, ND (US) 58541

(*) Notice: Subject to any disclaimer, the term of this patent is extended or adjusted under 35 U.S.C. 154(b) by 0 days.

(21) Appl. No.: 10/449,812

(22) Filed: May 30, 2003

(65) Prior Publication Data

US 2004/0068886 A1 Apr. 15, 2004

Related U.S. Application Data (63) Continuation-in-part of application No. 09/858,311, filed on May 15, 2001, now abandoned.

(51) Int. Cl.[7] .................................................. G01B 3/12
(52) U.S. Cl. .............................. 33/773; 33/760; 33/780; 33/755
(58) Field of Search ........................... 33/773, 413, 755, 33/758–760, 772–775, 780, 555.4, 555.1

(56) References Cited

U.S. PATENT DOCUMENTS

| | | | | | |
|---|---|---|---|---|---|
| 5,035,064 A | * | 7/1991 | Care | ............................ | 33/760 |
| 5,161,313 A | * | 11/1992 | Rijlaarsadam | ............... | 33/773 |
| 5,477,622 A | * | 12/1995 | Skalnik | ....................... | 33/781 |
| RE37,824 E | * | 9/2002 | Pullen | ........................ | 242/379 |

* cited by examiner

Primary Examiner—Christopher W. Fulton
Assistant Examiner—Tania Courson
(74) Attorney, Agent, or Firm—David G. Henry (57) ABSTRACT

An antler scoring system for enabling efficient and accurate measurement of antlers. The antler scoring system includes a housing, a wheel member rotatably attached to the housing, a central processing unit within the housing in communication with the wheel member, a ruler extendably positioned within the housing, and an idler roller positioned within the neck of the housing opposite of the wheel member with the ruler positioned between thereof. When the idler roller is engaged, the ruler is measured by the wheel member. The ruler preferably includes an engaging member that has a side opening for receiving a portion of the ruler during measuring of the antler circumference and inside spread.

20 Claims, 7 Drawing Sheets

ANTLER SCORING SYSTEM

CROSS-REFERENCE TO RELATED U.S. PATENT APPLICATION

We hereby claim benefit under Title 35, United States Code, Section 120 of U.S. patent application Ser. No. 09/858,311 filed May 15, 2001. This application is a continuation-in-part of the Ser. No. 09/858,311 application. The Ser. No. 09/858,311 application is now abandoned. The Ser. No. 09/858,311 application is hereby incorporated by reference into this application.

BACKGROUND OF THE INVENTION

1. Field of the Invention

The present invention relates generally to antler scoring systems and more specifically it relates to an antler scoring system for enabling efficient and accurate measurement of antlers.

2. Description of the Prior Art

Antler measuring systems have been in use for years. The three most commonly utilized antler measuring systems are BOONE & CROCKET, SAFARI CLUB INTERNATIONAL, AND BUCKMASTERS TROPHY RECORDS. All of these antler scoring systems provide a "score sheet" for an "official measurer" to record various measurements such as the number of points on the left and right antlers, the tip-to-tip spread, the greatest spread between the antlers, the inside spread of the main beams, total lengths of abnormal points, length of main beam, length of each individual point, circumference at smallest place between burr and first point, circumference at smallest place between each of the points and various other required measurements. These calculations are combined into a formula to generate a "final score" that is utilized to provide the overall score for the antlers. The formula may be comprised of various equations that provide a consistent scoring system.

The main problems with conventional antler scoring systems is that they require an individual to first measure using a tape measure or similar instrument then record the measurement in writing upon the score sheet. This process is time consuming, tedious and prone to mistakes or misunderstandings. A further problem with conventional antler scoring systems is that they are not convenient to utilize in the field, i.e. immediately after an animal has been taken. A further problem with conventional antler scoring systems is that they are not easily utilized by game farmers and biologists to calculate a score of an animal within a chute or sedated without causing prolonged stress to the animal.

While these systems may be suitable for the particular purpose they address, they are not as suitable for enabling efficient and accurate measurement of antlers. Conventional antler measuring systems are both time consuming and difficult to utilize.

In these respects, the antler scoring system according to the present invention substantially departs from the conventional concepts and designs of the prior art, and in so doing provides an apparatus primarily developed for the purpose of enabling the efficient and accurate measurement of antlers.

SUMMARY OF THE INVENTION

In view of the foregoing disadvantages inherent in the known types of antler measuring systems now present in the prior art, the present invention provides a new antler scoring system construction wherein the said invention can be utilized for enabling efficient and accurate measurement of antlers.

The general purpose of the present invention, which will be described subsequently in greater detail, is to provide a new antler scoring system that has many of the advantages of the antler measuring systems mentioned heretofore and many novel features that result in a new antler scoring system which is not anticipated, rendered obvious, suggested, or even implied by any of the prior art antler measuring systems, either alone or in any combination thereof.

To attain this, the present invention generally comprises a housing, a wheel member rotatably attached to the housing, a central processing unit within the housing in communication with the wheel member, a ruler extendably positioned within the housing, and an idler roller position within the neck of the housing opposite of the wheel member with the ruler positioned between thereof. When the idler roller is engaged, the ruler is measured by the wheel member. The ruler preferably includes an engaging member that has a side opening for receiving a portion of the ruler during measuring of the antler circumference. The user first utilizes the ruler to measure the inside spread between the main beams and the circumferences between each tine, all of which may or may not be entered into a keypad. The user then utilizes the wheel member to measure the length of the main beams and each typical tine length, as well as non-typical tine length if they exist. The central processing unit combines the total measurements to generate a final score or final scores based upon one or more antler scoring systems, examples possibly being but not limited to BOONE & CROCKET, SAFARI CLUB INTERNATIONAL, and BUCKMASTERS TROPHY RECORDS.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an antler scoring system that will overcome the shortcomings of the prior art devices.

A second object is to provide an antler scoring system for enabling the efficient and accurate measurement of antlers.

Another object is to provide an antler scoring system that may be utilized in various field conditions.

An additional object is to provide an antler scoring system that reduces the stress an animal incurs while their antlers are being measured.

A further object is to provide an antler scoring system that is comprised of a compact structure that may be easily transported, i.e. during a hunt, in the field by biologists and game farms.

Another object is to provide an antler scoring system that may score the antlers of an animal utilizing one or more of the conventional scoring methods, examples possibly being but not limited to BOONE & CROCKET, SAFARI CLUB INTERNATIONAL, and BUCKMASTERS TROPHY RECORDS.

A further object is to provide an antler scoring system that reduces human error in calculating a final score.

Another object is to provide an antler scoring system that simplifies the process for calculating a score for antlers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the said invention becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 11 illustrate an antler scoring system 10, which comprises a housing 20, a wheel member 40 rotatably attached to the housing 20, a central processing unit within the housing 20 in communication with the wheel member 40, a ruler 30 extendably positioned within the housing 20, and an idler roller 36 positioned within the neck 28 of the housing 20 opposite of the wheel member 40 with the ruler 30 positioned between thereof. When the idler roller 36 is engaged, the ruler 30 is measured by the wheel member 40. The ruler 30 preferably includes an engaging member 32 that has a side opening 38 for receiving a portion of the ruler 30 during measuring of the antler circumference.

The user first utilizes the ruler 30 to measure the inside spread between the main beams and the circumference of the antler/horns 12. The user then utilizes the wheel member 40 to measure the length of the main beams, each typical tine length and non-typical tine if present. The central processing unit 31 combines the total measurements to generate a final score or final scores based upon one or more antler scoring systems, examples possibly being but not limited to BOONE & CROCKET, SAFARI CLUB INTERNATIONAL, and BUCKMASTERS TROPHY RECORDS.

As shown in FIGS. 1 through 4 of the drawings, the housing 20 is preferably comprised of an elongate structure having a neck 28. It can be appreciated that the housing 20 may have various shapes, sizes, structures and designs wherein the housing 20 illustrated within the drawings is merely for illustration purposes only.

A central processing unit 31 contained within the housing 20. The central processing unit 31 includes a general purpose digital processor which controls the operation of the central processing unit 31. The microprocessor can be a single-chip processor or implemented with multiple components.

Using instructions retrieved from memory, microprocessor controls the reception and manipulations of input data and the output and display 22 of data on output devices such as the display 22. A data port 50 may be in communication with the central processing unit to allow for the exchange of data with a computer or other electronic device.

Figure 1:
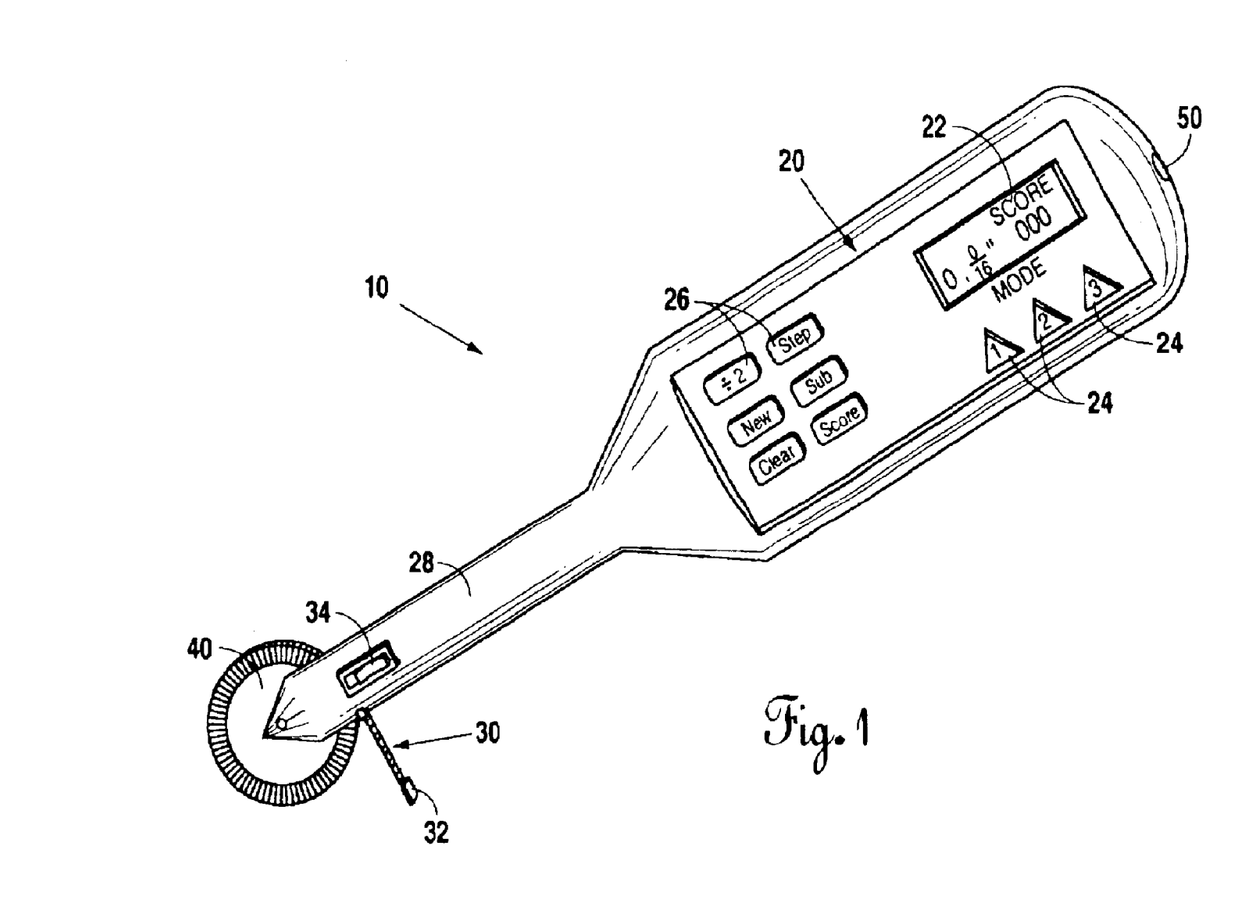
FIG. 1 is an upper perspective view of the present invention.
Figures 2, 3:
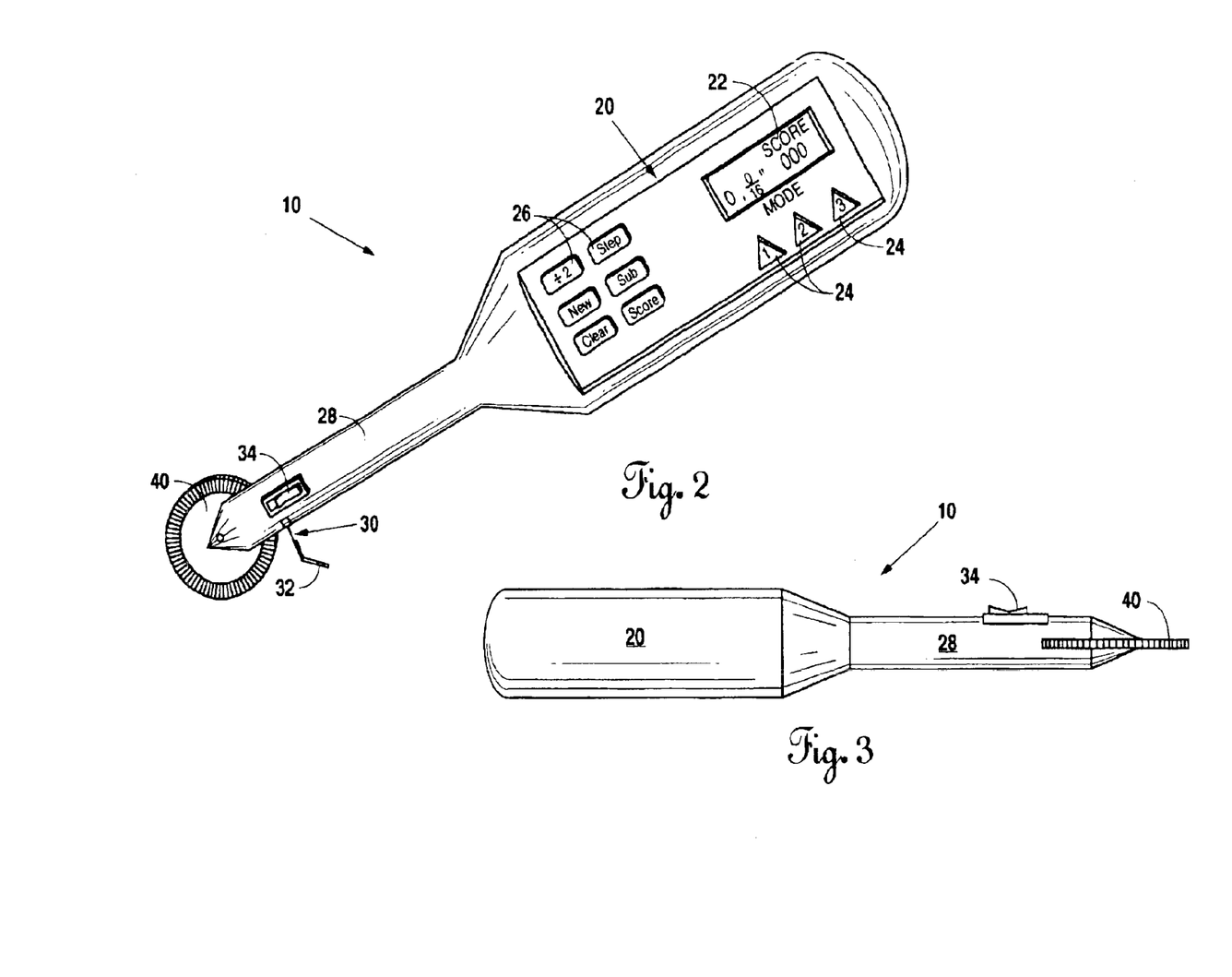
FIG. 2 is a side view of the present invention illustrating the display.
FIG. 3 is a top view of the present invention.
Figure 4:
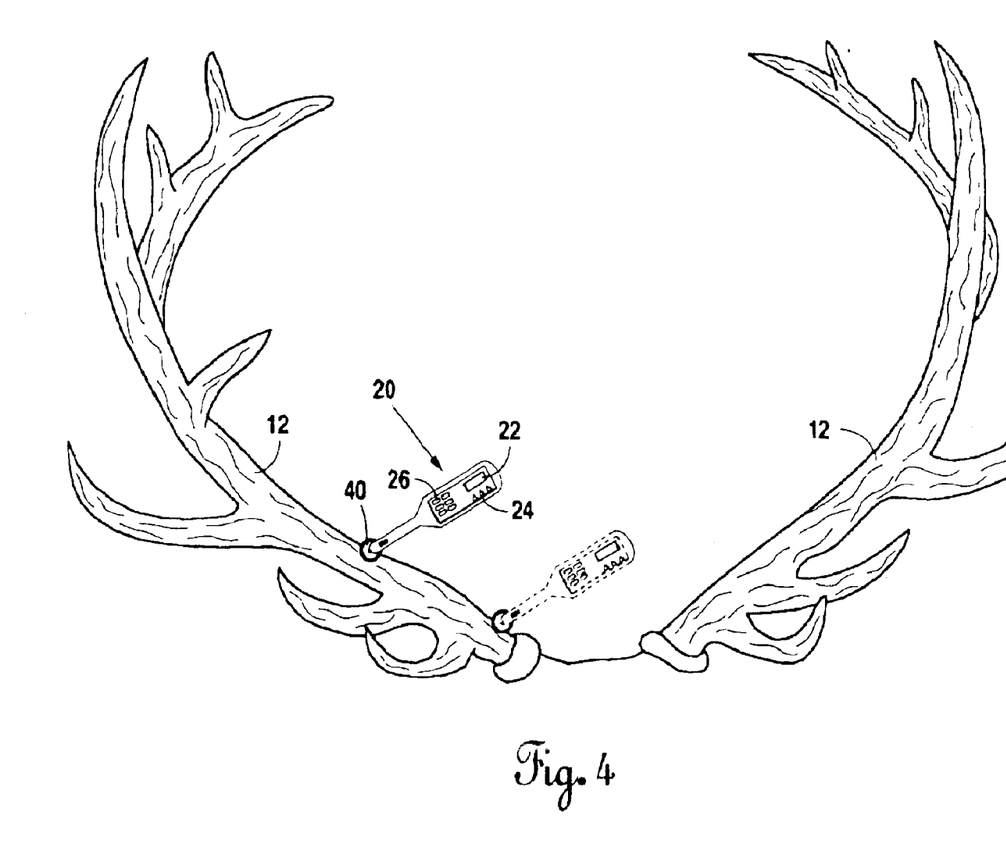
FIG. 4 is an upper perspective view of the present invention being utilized to measure the length of the main beam of an antler.
Figure 5:
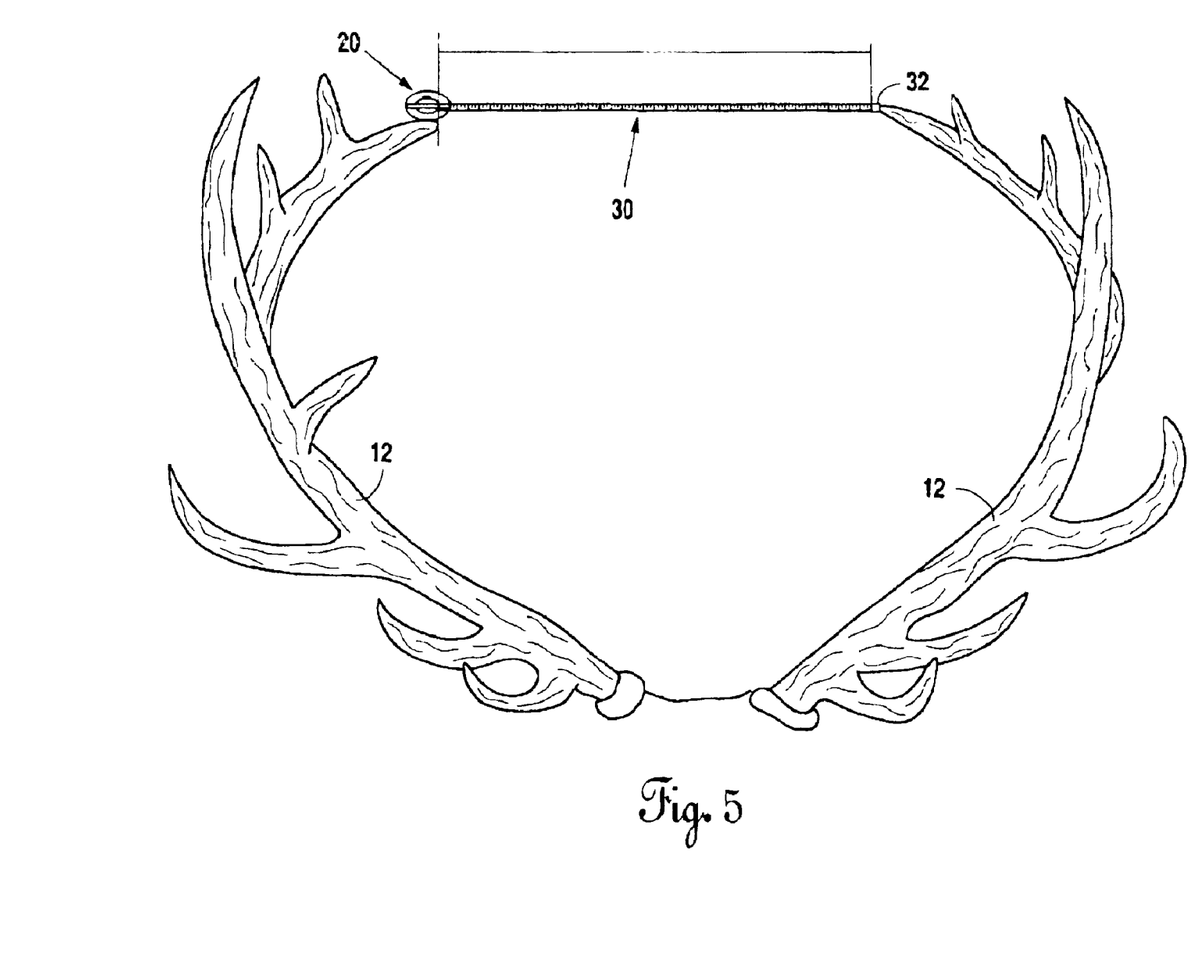
FIG. 5 is a front view of the present invention measuring the distance between the inside spread at the widest point.

As shown in FIGS. 1 and 2 of the drawings, a display 22 is positioned within the housing 20 for displaying the measurements, mode, final score and various other items. The display 22 is in communication with the central processing unit via conventional communication means. The display 22 may have various sizes, shapes and locations within the housing 20 as can be appreciated.

A keypad 26 is also provided within the housing 20 and in communication with the central processing unit for allowing the manual selection of which various measurements are to be taken, i.e. the spread, right or left beams, right or left tines, right or left circumference, right or left non-typical tines, or other extra and various measurements. The keypad 26 may also allow for the adjustment of various items such as the format of the measurements (i.e. inches or centimeters). The keypad 26 may include various buttons with various functionalities such as but not limited to automated division by a number such as 2 or 4. The keypad 26 may allow the manual entry of measurements into the central processing unit or allow the user to select the scoring system to be utilized to measure the antlers 12, examples possibly being but not limited to BOONE & CROCKET, SAFARI CLUB INTERNATIONAL, and BUCKMASTERS TROPHY RECORDS.

As shown in FIGS. 1 through 4 of the drawings, the wheel member 40 is rotatably attached to a distal portion of the neck 28 of the housing 20. The wheel member 40 is able to rotate upon a surface such as the main beam of the antlers 12 to allow for the measurement of individual features such as the main beam length and the circumference of the main beam.

The wheel member 40 is measured by a measuring device that is comprised of standard technology that communicates to the central processing unit the distance the wheel member 40 has traveled upon. The wheel member 40 is preferably comprised of a rubber coated structure for engaging a surface and the ruler 30, however the wheel member 40 may be comprised of various other types of materials and structures.

A ruler 30 is preferably positioned within the housing 20 that is extendible from within the housing 20. The ruler 30 may be comprised of any well known compact and extendible structure that are commonly utilized to construct conventional tape measures and the like, an example being steel.

Figure 6:
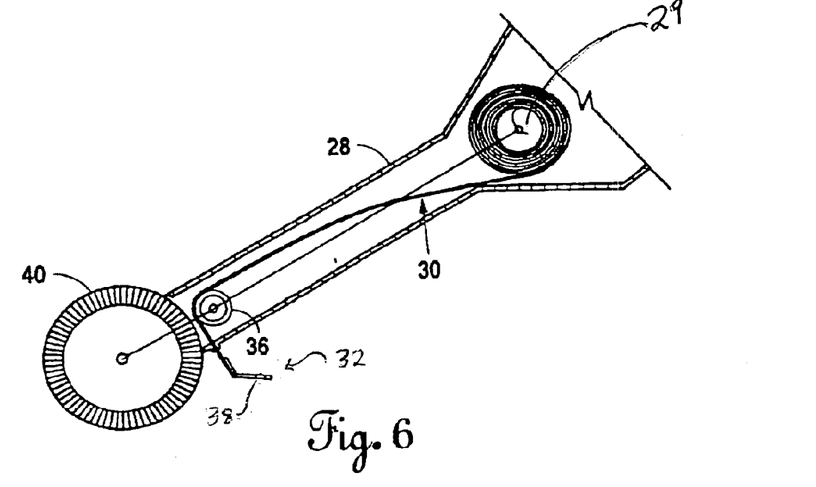
FIG. 6 is a side cutaway view of the neck of the housing illustrating the idler roller in the released position.
Figures 7, 7A:
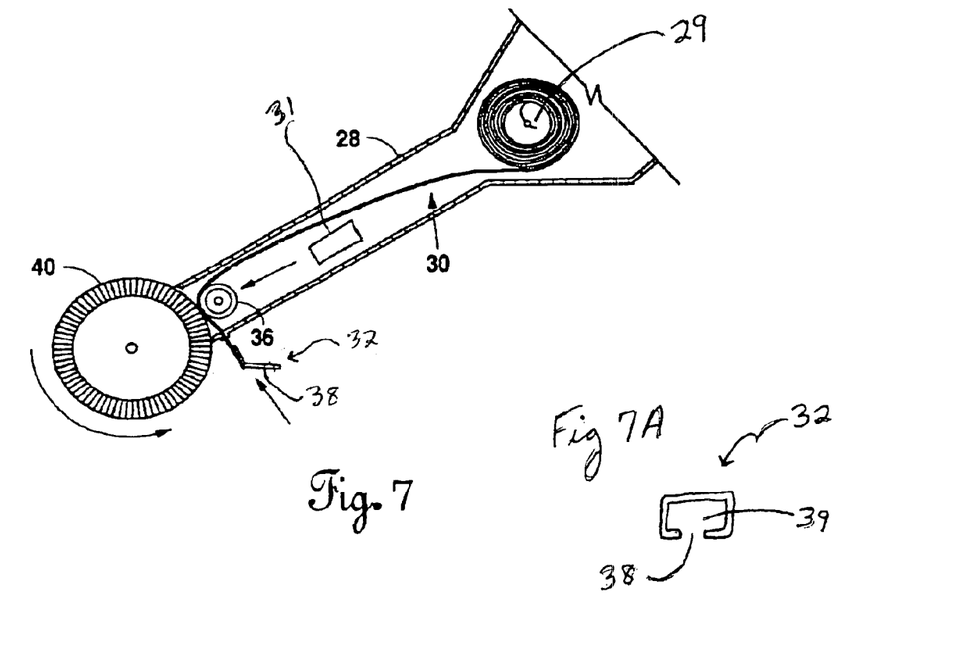
FIG. 7 is a side cutaway view of the neck of the housing illustrating the idler roller in the engaged position.

The ruler 30 preferably is contained within the housing 20 upon a spool unit 29 that allows for the extension and retraction of the ruler 30 with respect to the housing 20 as best illustrated in FIGS. 6 and 7 of the drawings. The ruler 30 preferably extends outwardly from the housing 20 through a slot between the wheel member 40 and the idler roller 36 as further shown in FIGS. 6 and 7 of the drawings. The ruler 30 is in engagement with the wheel member 40 when the idler roller 36 is engaged toward the wheel member 40 thereby allowing automatic measuring of the ruler 30 as illustrated in FIG. 7.

The ruler 30 preferably includes an engaging member 32 at the distal end thereof for usage in determining manual measurements. The engaging member 32 having a generally rectangular shape with a center opening 39 and a side opening 38 for allowing selective receiving of a portion of said ruler during the measurement of a circumference of an antler 12 as shown in FIGS. 6, 7, 7A, and 9 of the drawings. The distal portion of the engaging member 32 has a hooked portion to prevent the ruler 30 from accidentally escaping from the engaging member 32 during measurement of the circumference of the antlers 12.

The idler roller 36 is rotatably supported within the housing 20 as shown in FIGS. 6 and 7 of the drawings. The idler roller 36 is positioned in opposition to the wheel member 40 and is designed to rotatably support the ruler 30 as the ruler 30 is extended from the interior of the housing 20.

Figure 10:
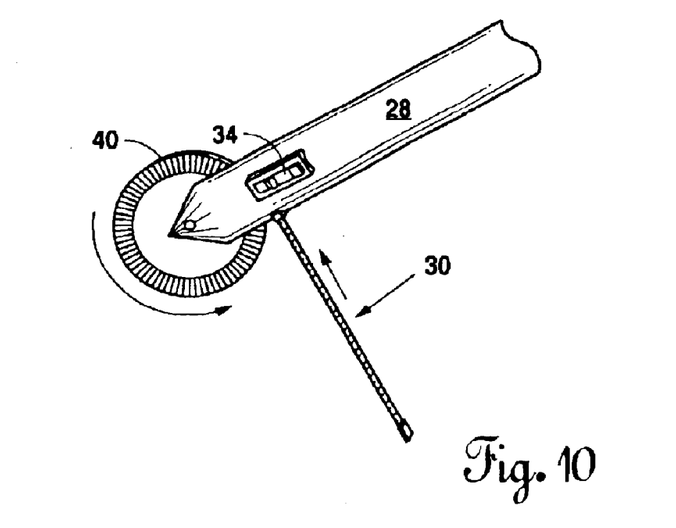
FIG. 10 is a side view of the present invention with the control switch moved toward the wheel member thereby providing engagement of the idler roller.
Figure 11:
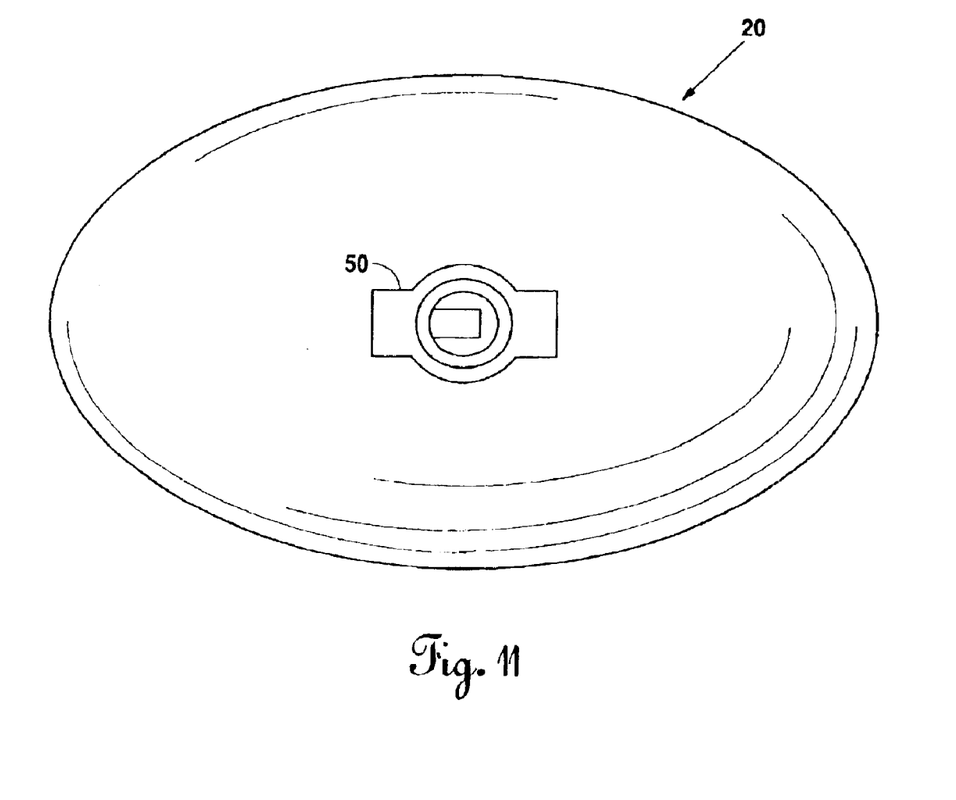
FIG. 11 is a rear view of the present invention illustrating the data port.

A control switch 34 is mechanically connected to the idler roller 36 thereby allowing the user to manually position the idler roller 36 in the released position (FIG. 6) or the engaged position (FIG. 7). The user simply pushes the control switch 34 toward the wheel member 40 to engage the idler roller 36 against the wheel member 40 with the ruler 30 position between thereof as shown in FIGS. 7 and 10 of the drawings.

The control switch 34 is part of a sliding structure that rotatably supports the idler roller 36 within the housing 20. The sliding structure may be comprised of various structures that are slidably positionable within the housing 20 that are capable of rotatably supporting the idler roller 36.

When the released position, the idler roller 36 rotatably supports the ruler 30 but the idler roller 36 does not position the ruler 30 adjacent to the wheel member 40. When in the engaged position, the roller 36 positions the body of the ruler 30 adjacent to the wheel member 40 thereby frictionally engaging and rotating the wheel member 40 when the ruler 30 is extended or retracted back into the housing as shown in FIGS. 7 and 10 of the drawings.

Examples of measuring devices currently within the marketplace of the SCALE MASTER CLASSIC manufactured by CALCULATED INDUSTRIES (www.calculated.com), and the PLANWHEEL manufactured by SCALEX CORPORATION (www.scalex.com). These products are considered relevant to the central processing unit, the measuring device and wheel member 40 of the present invention and are incorporated herein by reference. The aforementioned products, some of which are mentioned elsewhere in this disclosure, and which form a part of this disclosure, may be applied in known manner by those skilled in the art in order to practice various embodiments of the present invention.

Figure 8:
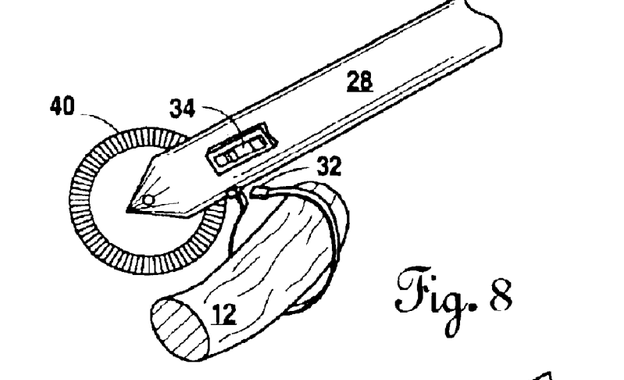
FIG. 8 is a side perspective view of the present invention with the ruler loosely surrounding an antler shaft.
Figure 9:
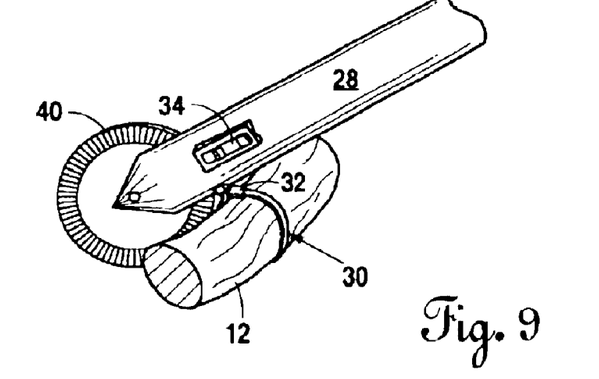
FIG. 9 is a side perspective view of the present invention with the ruler tightly surrounding an antler shaft.

In use, the user selects the mode by depressing one of the mode selectors 24 to place the central processing unit into the desired scoring mode, examples possibly being but not limited to BOONE & CROCKET, SAFARI CLUB INTERNATIONAL, and BUCKMASTERS TROPHY RECORDS. The user then selects a button upon the keypad 26 to indicate to the central processing unit which measurement is going to be taken such as the total lengths of abnormal points, the length of main beam, length of each individual point, circumference at smallest place between burr and first point, circumference at smallest place between each of the points and various other required measurements. The user then positions the wheel member 40 in the desired location upon the antlers 12 and moves the wheel member 40 to take the required measurement. When finished taking the measurement, the user then selects a button upon the keypad 26 to indicate that the measurement is completed. The central processing unit then stores the measurement as indicated by the user for calculating the final score. This process continues for each of the other measurements that may be taken with the wheel member 40. The user then utilizes the ruler 30 to measure various measurement including the tip-to-tip spread, the greatest spread between the antlers 12 and the inside spread of the main beams. The circumference of the antlers 12 may be measured by extending the ruler 30 about the antler 12 with the engaging member 32 attached to the ruler 30 as shown in FIGS. 8 and 9 of the drawings. The user then retracts the ruler 30 back into the housing 20 with the idler roller 36 engaged against the wheel member 40 wherein the wheel member 40 calculates the distance traveled along the ruler 30 which indicates the circumference distance. The user may also manually enter other measurements into the keypad 26 such as the number of points on the left and right antlers 12 and various other measurements. After all of the required measurements are taken, the central processing unit then calculates the final score based upon the selected scoring system equation (i.e. BOONE & CROCKET, SAFARI CLUB INTERNATIONAL, and BUCKMASTERS TROPHY RECORDS). The final score is then shown upon the display 22 for the user to view.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| INDEX OF ELEMENTS FOR ANTLER SCORING SYSTEM (TROU-007) ENVIRONMENTAL ELEMENTS | |
|---|---|
| 10. | Antler Scoring System |
| 11. | |
| 12. | Antlers |
| 13. | |
| 14. | |
| 15. | |
| 16. | |
| 17. | |
| 18. | |
| 19. | |
| 20. | Housing |
| 21. | Alignment Pointer |
| 22. | Display |
| 23. | |
| 24. | |
| 25. | |
| 26. | Keypad |
| 27. | |
| 28. | Neck |
| 29. | |
| 30. | Ruler |
| 31. | |
| 32. | Engaging Member |
| 33. | |
| 34. | Control Switch |
| 35. | |
| 36. | Idler Roller |
| 37. | |
| 38. | Side Opening |
| 39. | |
| 40. | Wheel Member |
| 41. | |
| 42. | |
| 43. | |
| 44. | |
| 45. | |
| 46. | |
| 47. | |
| 48. | |
| 49. | |
| 50. | Data Port |
| 51. | |
| 52. | |
| 53. | |
| 54. | |
| 55. | |
| 56. | |
| 57. | |
| 58. | |
| 59. | |
| 60. | |
| 61. | |
| 62. | |
| 63. | |
| 64. | |
| 65. | |
| 66. | |
| 67. | |
| 68. | |
| 69. | |
| 70. | |
| 71. | |
| 72. | |
| 73. | |
| 74. | |
| 75. | |
| 76. | |
| 77. | |
| 78. | |
| 79. | |

We claim:

1. An antler measurement system, comprising:
a housing;
a wheel measuring unit rotatably positioned within said housing;
an idler roller rotatably and slidably positioned within said housing, wherein said idler roller is capable of being in an engaged position wherein said idler roller slides into engagement with said wheel measuring unit and wherein said idler roller is capable of being in a released position wherein said idler roller slides to a distally spaced relationship relative to said wheel measuring unit; and
a ruler attached about a spool within said housing and extendable between said wheel measuring unit and said idler roller, wherein said ruler extends through an opening within said housing.

2. The antler measurement system of claim 1, wherein said wheel measuring unit is in communication with a central processing unit for providing measurements to said central processing unit.

3. The antler measurement system of claim 2, wherein said central processing unit is able to calculate a final score based upon measurements computed utilizing an antler scoring system.

4. The antler measurement system of claim 2, including a display within said housing and in communication with said central processing unit.

5. The antler measurement system of claim 2, including a keypad within said housing and in communication with said central processing unit for entering data into said central processing unit.

6. The antler measurement system of claim 2, including a data port in communication with said central processing unit for receiving and transmitting digital data.

7. The antler measurement system of claim 1, including a control switch for allowing manipulation and sliding of said idler roller.

8. The antler measurement system of claim 1, wherein said housing has an elongate neck supporting said wheel measuring unit.

9. The antler measurement system of claim 1, wherein said wheel measuring unit is comprised of a wheel member having a rubber outer surface.

10. The antler measurement system of claim 1, wherein said ruler is comprised of a flexible elongate structure.

11. An antler measurement system, comprising:
a housing;
a wheel measuring unit rotatably positioned within said housing;
an idler roller rotatably slidably positioned within said housing, wherein said idler roller is capable of being in an engaged position wherein said idler roller slides into engagement with said wheel measuring unit and wherein said idler roller is capable of being in a released position wherein said idler roller slides to a distally spaced relationship relative to said wheel measuring unit;
a ruler attached about a spool within said housing and extendable between said wheel measuring unit and said idler roller, wherein said ruler extends through an opening within said housing; and
an engaging member having a generally rectangular or closed shape with a center opening and a side opening for allowing selective receiving of a portion of said ruler during the measurement of a circumference of an antler.

12. The antler measurement system of claim 11, wherein said wheel measuring unit is in communication with a central processing unit for providing measurements to said central processing unit.

13. The antler measurement system of claim 12, wherein said central processing unit is able to calculate a final score based upon measurements computed utilizing an antler scoring system.

14. The antler measurement system of claim 12, including a display within said housing and in communication with said central processing unit.

15. The antler measurement system of claim 12, including a keypad within said housing and in communication with said central processing unit for entering data into said central processing unit.

16. The antler measurement system of claim 12, including a data port in communication with said central processing unit for receiving and transmitting digital data.

17. The antler measurement system of claim 11, including a control switch for allowing manipulation and sliding of said idler roller.

18. The antler measurement system of claim 11, wherein said housing has an elongate neck supporting said wheel measuring unit.

19. The antler measurement system of claim 11, wherein said wheel measuring unit is comprised of a wheel member having a rubber outer surface.

20. The antler measurement system of claim 11, wherein said ruler is comprised of a flexible elongate structure.

* * * * *